US006861084B2

(12) United States Patent
Fallowes

(10) Patent No.: US 6,861,084 B2
(45) Date of Patent: Mar. 1, 2005

(54) METHOD OF ROASTING FOOD PRODUCTS

(76) Inventor: Gary Scott Fallowes, 5949 Dirac St., San Diego, CA (US) 92122

( * ) Notice: Subject to any disclaimer, the term of this patent is extended or adjusted under 35 U.S.C. 154(b) by 361 days.

(21) Appl. No.: 10/075,186

(22) Filed: Feb. 14, 2002

(65) Prior Publication Data

US 2003/0091712 A1 May 15, 2003

Related U.S. Application Data

(60) Provisional application No. 60/331,301, filed on Nov. 14, 2001.

(51) Int. Cl.[7] .............................................. A23L 1/01
(52) U.S. Cl. ...................................... 426/523; 426/466
(58) Field of Search ................................ 426/520, 523, 426/466; 99/420, 421 R, 421 H, 427, 443 C

(56) References Cited

U.S. PATENT DOCUMENTS 3,734,740 A * 5/1973 Zenos ......................... 426/523

5,709,142 A * 1/1998 Nersesian ..................... 99/420

* cited by examiner

Primary Examiner—George C. Yeung
(74) Attorney, Agent, or Firm—Herman Hohauser

(57) ABSTRACT

A food preparation apparatus having a food carrier holding one or more articles of food being removeably positioned on a transport mechanism for travel in a linear direction and being simultaneously rotated and advanced subjecting the food to a predetermined level of cooking heat wherein the carrier has a predetermined weakened area for improved handling of the food after cooking. A food preparation apparatus having a discharge station allowing finished products to safely exit and not immediately handled by the operator. Because of the magnetic rail system the food-mounting skewer stays in place horizontally (hangs in space,) while pushed further along the rail by the next product. This is extremely useful for operations such as amusement parks and carnivals where the operator's attention is frequently distracted. The food being discharged will simply move along the rail, and wait for the operator, there is no chance of the product falling, or piling up due to lack of operator attention.

17 Claims, 5 Drawing Sheets

METHOD OF ROASTING FOOD PRODUCTS

CROSS REFERENCE AND CLAIM OF PRIORITY

This application is related to Provisional Application 60/331,301 filed Nov. 14, 2001. The benefit under 35 U.S.C.119(e) is hereby claimed for Provisional Application 60/331,301.

FIELD OF INVENTION

The invention pertains to automated cooking devices. The invention specifically relates to machines that are capable of simultaneously heating, rotating and transporting food products mounted on holding devices introduced into the machine. There is a specific entrance and exit for the transported devices, as opposed to a continuous or endless cooking apparatus.

BACKGROUND OF THE INVENTION

Various types of machines have been developed for heating, rotating and transporting food products mounted on skewers or other holding devices; incorporating a number of different technologies. Zenos, U.S. Pat. No. 3,734,740, incorporates a pair of chain conveyors, each having corresponding support brackets designed to accommodate opposite ends of a skewer upon which a food product is mounted. The chain conveyors transport the skewered food past heating elements at a fixed speed to heat the food.

Boosalis, deceased et al., U.S. Pat. No. 4,440,071, employs two vertically oriented chain conveyors to transport skewer mounted food past a series of heating elements and a gear toothed rack adjacent one conveyor to impart a rotational motion to the skewers to control the evenness of heating of the skewered food.

Neresian, U.S. Pat. No. 5,490,451, utilizes an overhead chain conveyor to suspend and transport a series of vertically oriented skewers past a series of heating elements and reflectors arranged in vertical rows. Each of the skewers includes a stripper disk for removing the food products from the skewer and a clip to retainer the products. The skewers circle the heating elements and reflectors until the food products are sufficiently heated.

Spurgeon, U.S. Pat. No. 1,111,870, comprises a marshmallow-toasting machine that includes a gas burner ring over which a series of marshmallows mounted on skewers is rotated for toasting. The skewers are mounted to a series of drive wheels that are driven around a circular track by an X-shaped arm. This apparatus causes the skewers to rotate as they pass over the burner ring.

Castronuovo, U.S. Pat. No. 3,744,403, discloses a marshmallow toasting device employing a rotating wheel having a series of skewer holders perpendicularly mounted to its upper surface. Skewers are fitted into the holders and marshmallows impaled upon the skewers. The disk rotates the skewers past a series of light bulbs mounted inside of a heat-reflecting cover to toast the marshmallows.

U.S. Pat. No. 1,984,700 describes a handle and core for frozen confections. The device comprises a length of wood or similar material having a handle end and a confection end. The confection end includes a number of indentations that facilitate breaking portions of the material off as the confection is eaten from the distal end. This facilitates removing further pieces of the confection without interference from the portion of the device from which the confection has already been eaten.

While other variations exist, the above-described designs for devices for heating, rotating and transporting food products mounted on skewers, skewers or other holding devices are typical of those encountered in the prior art. It is an objective of the present invention to provide a machine for evenly toasting and roasting food products in an automated fashion while minimizing required handling during loading and heating. It is a still further objective of the invention to provide the above-described capabilities in an inexpensive and durable machine that is capable of extended duty cycles and that may be easily repaired and maintained. It is yet a further objective to provide these capabilities in a machine that may be readily adapted to local conditions such as altitude or ambient temperature. It is still a further objective to provide a machine for toasting and roasting of food products in which the tip of the food support skewer does not contact anything except the food product pierced in mounting. It is still a further objective to provide a machine for toasting and roasting of food products in a fashion that has a beginning and an end of production as opposed to a continuous around and around format as previously described in prior art. Finally, it is an objective of the invention to provide a means to remove the toasted or roasted food products from the devices holding them for heating that minimizes handling of the food products once heated and delivered to a consumer.

While some of the objectives of the present invention are disclosed in the prior art, none of the inventions found include all of the requirements identified.

SUMMARY OF THE INVENTION

The present invention addresses the deficiencies of prior art roasting and toasting machine inventions and satisfies each of the above objectives.

A progressive roasting and toasting machine providing the above features is constructed from the following components. An enclosure including a base with an upper surface and a lower surface is provided, said base and upper surfaces being parallel. Four vertical members of equal length join the upper and lower surfaces. A horizontal guide rail mounted approximately two-thirds of the way up two of the vertical members is provided. The guide rail is parallel to the above described mutually parallel base and upper surfaces. The guide rail is constructed of ferromagnetic material of U-shaped cross section. It comprises two pieces with a coupling that aligns the segments. The coupling is located at the point where the guide rail emerges from between the upper and lower surfaces. This permits removal of the portion of the guide rail outside of the rectangular volume enclosed by the upper and lower surfaces for easier packing and shipping. Multiple permanent magnets of rectangular cross section and width equal to the inside width of the slot in the guide rail are provided. The magnets extend the full length of the guide rail. The spacing of the magnets varies along the length of the guide rail, such that in the portion of the guide rail within the above rectangular volume the spaces between magnets approximates ⅓ of their individual lengths and outside the volume the space between magnets approximates their full length. The height of said permanent magnet is ⅓ of the depth of the slot in the guide rail.

A removable skewer holder is provided. The skewer holder is formed of ferromagnetic material. This skewer holder comprises four concentric cylindrical sections each of predetermined width with a first end, and a second end. A cavity extends from the first end, but not all the way through, toward the second end. The cylindrical sections, starting from the first end are term the first section, the second section, the third section and the forth section. The diameters of the second and forth cylindrical sections are equal, and are less than the diameter of the third cylindrical section, such that the skewer holder rests on the top surfaces of the guide rail without the second cylindrical contacting the bottom of the guide rail. The diameter of the first cylindrical section is less that the diameter of the second and forth cylindrical sections. Because the diameter of the second and forth cylindrical sections are equal, and the width of the larger diameter section of the skewer holder is less than the width of the slot in the guide rail, the skewer holder does not bind as it is moved along the slot in the guide rail. Hereinafter, the first cylindrical section of the skewer holder is referred to as the roller.

A food-mounting skewer is provided. The food-mounting skewer of second predetermined length has a first end and a second end. The first end of the food-mounting skewer is sized and shaped to pierce food portions. The second end of the food-mounting skewer is sized and shaped to fit, and to be held by friction, within the cavity of the skewer holder. The food-mounting skewer is unique and key feature to the invention by virtue of the thermal characteristics of the balsa wood of which it is made and the scoring across its length that allows for individual portioning of multiple products along its length. In the preferred embodiment there are two scores for accommodating three marshmallows.

A helix-shaped, spring-like, drive is provided. The helix-shaped drive has a first end, a second end, a third predetermined length and a second predetermined diameter. The pitch of the helix-shaped drive is sized to permit the diameter of the first roller fits between adjacent coils of the helix-shaped drive. A helix-shaped drive support is provided. The helix-shaped drive support is located adjacent and parallel to the first guide rail. It is sized and shaped to support the helix-shaped drive such that the an outer portion of the first roller of the skewer holder is located between adjacent coils while an inner portion of the first roller is located on the top edge of the guide rail. The helix-shaped drive support is secured to the upper surface of the base. A motor outside of the rectangular volume, via a coupling, rotates the helix-shaped drive at one or more speeds. A heating element is provided. The heating element is suspended above the food-mounting skewer when the skewer is mounted in the cavity of the roller and extends along the helix-shaped drive within the rectangular volume.

When a food portion is pierced with the first end of the food-mounting skewer and the second end of the food-mounting skewer is fitted into the cavity at the roller, the skewer holder is positioned with the roller on the top edge of the first guide rail and between adjacent coils of the helix-shaped drive, the heating element energized and the helix-shaped drive rotated, the food portion will be uniformly heated and rotated on the food-mounting skewer as it moves beneath the heating element.

In a variant of the invention, a second horizontal guide rail is provided. The second guide rail has a first end and a second end separated by the first predetermined length, parallel top and bottom edges separated by the first predetermined height, parallel inner and outer sides separated by the first predetermined width, and is formed of ferromagnetic material. The second guide rail is parallel to and spaced from the first guide rail. Means are provided for magnetizing the second guide rail.

A second skewer holder is provided. The second the skewer holder is formed of ferromagnetic material and is attached at the second end to the central portion of the outer planar surface such that the first roller and the second roller have a single axis of rotation. The second roller bears upon the top edge of the second guide rail. The second guide rail and second roller further stabilize the skewer holder as the helix-shaped drive moves the skewer holder and the food-mounting skewer under the heating element.

In a further variant of the invention, an enclosing hood is provided. The hood contains the heating element attached to, and removable from, the base. In still a further variant, a heat resistant lubricating coating is applied to an upper surface of the helix-shaped drive support. In yet a further variant, the hood further comprises a removable heat shield positioned above the heating element.

In another variant, the helix-shaped drive support includes a central cavity extending from its first end to its second end. A lower surface of the helix-shaped drive support includes a first opening. The overall structure has four supporting legs serving to elevate the base above a horizontal surface.

In still another variant, a third opening is provided. The third opening penetrates the base adjacent the second opening and below the first horizontal guide rail. The ventilating fan is sized shaped and located to direct airflow into the second, first and third openings. When the ventilating fan is activated airflow will be directed into and through the helix-shaped drive support and into the vicinity of the first horizontal guide rail.

In a further variant of the invention, a fourth opening is provided. The fourth opening located in the base adjacent the means for rotating the helix-shaped drive. An exhaust fan is provided. The exhaust fan removes heated air from the vicinity of the means for rotating the helix-shaped drive.

In still a further variant, the heating element is powered by electricity. In another variant, the heating element is powered by gas. In yet another variant, an auxiliary storage rack is provided. The storage rack includes a pair of parallel members. Each of the members has an upper edge that extend outwardly from the first and second guide rails at the level of the top edges of the guide rails. The members are attached to—and removable from—the guide rails. Means are provided for supporting the storage rack. When the food portions mounted on the food-mounting skewer and secured to the skewer holder have passed under the heating element, they are stored in the storage rack for later distribution without further handling.

In still another variant of the invention, the enclosing hood includes ducting to isolate the means for rotating the helix-shaped drive from the heating element. In yet another variant, the enclosing hood includes a storage compartment capable of storing the mounting plates, food-mounting skewers and auxiliary storage rack.

In a further variant of the invention, the means for rotating the helix-shaped drive is an electric motor. In still a further variant, the progressive roasting and toasting machine includes a motor speed control. In yet a further variant, a heating element control circuit is provided. In another variant, a grease pan for catching drippings is provided. The pan is located below the heating element and angled to allow any grease contacting the pan to flow downwardly to an orifice located at a predetermined location. A removable grease storage container is provided. When the machine is used for roasting food portions that emit grease when heated, the grease is channeled to the storage container for disposal fire hazard reduction.

The food-mounting skewer may include one or more score marks between its first end and its second end. The food-mounting skewer is formed of material that may be easily broken at the score mark, leaving smooth edges adjacent a break. When the food portions are located on the food-mounting skewer with the food portions adjacent either the score mark or first end of the food-mounting skewer, the food portions are removable from the food-mounting skewer by breaking the skewer at the score mark and sliding the food portion over a minimum distance along the length of the skewer.

In a final variant of the invention, an automatic loading mechanism is provided. The mechanism comprises a vertically positioned guide rail with magnets aligned with and perpendicular to the horizontal guide. The vertical guide rail joins the horizontal guide rail at the end nearest the drive motor and with the slots aligned as described permits the largest diameter cylinder of the skewer holder to move smoothly from one to the other. As described previously, the spacing between the magnets in the slot of the vertical guide rail is varied such that the magnets are closely spaced at the top of the guide rail and less closely spaced at the bottom. Thus, the helix-shaped drive is able the overcome the magnetic force holding the skewer holder in the vertical guide rail and remove the skewer holder from the vertical slot and move it along the length of the horizontal guide rail. An opening in the top surface is provided to accommodate the vertical guide rail, skewer holder, skewer and the product. Support of the vertical guide rail is provided by a coupling at the junction with the horizontal guide rail and a bracket connected to the top surface.

The accompanying drawings and the detailed description of a preferred embodiment and some of the alternatives provides a greater understanding of the invention.

DESCRIPTION OF THE DRAWINGS

FIG. 4 comprises two parts

DETAILED DESCRIPTION OF THE PREFERRED EMBODIMENT

Figure 1:
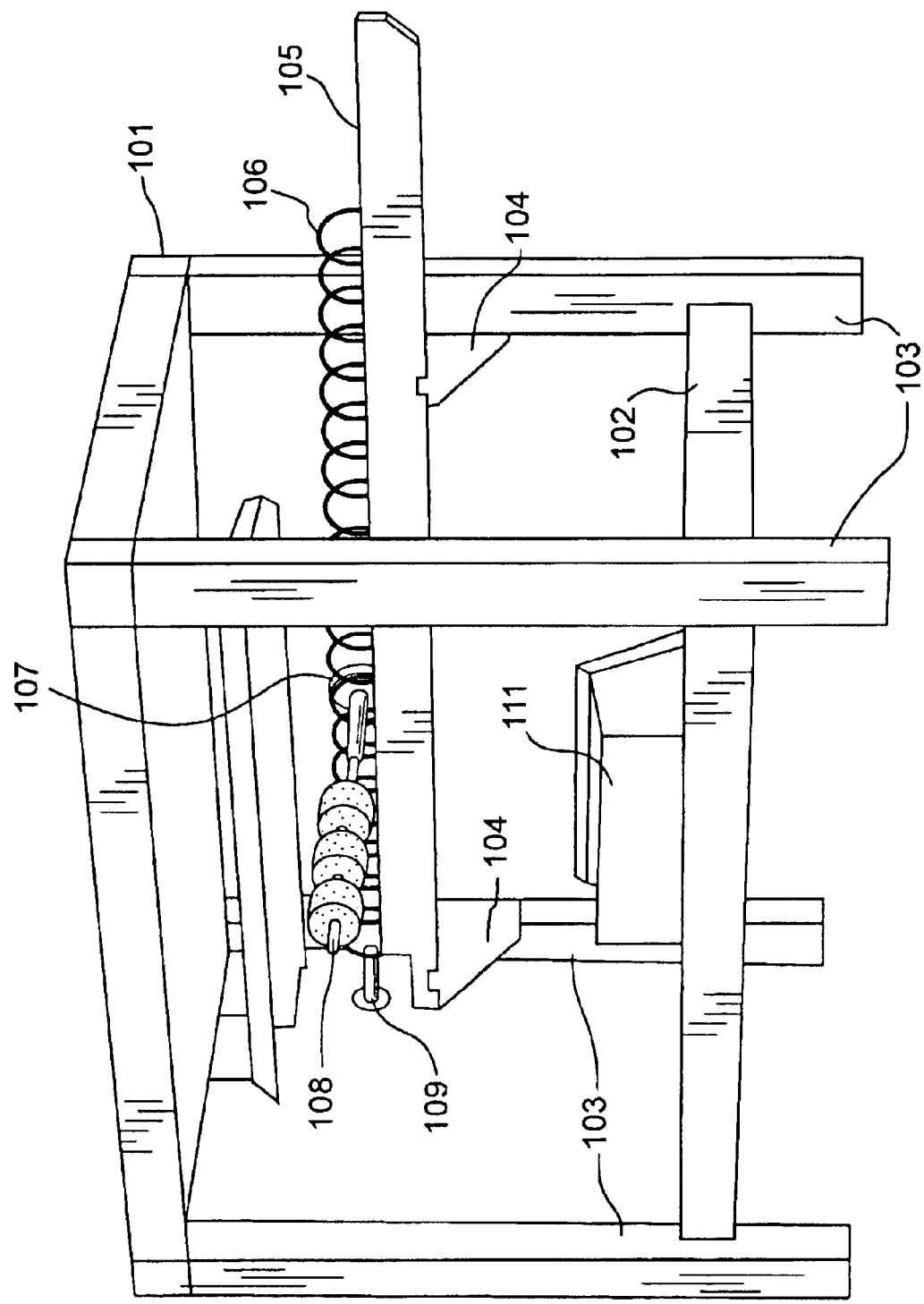
FIG. 1 is a perspective view of the preferred embodiment of the invention.

Referring to FIG. 1, the overall enclosure comprises a top surface 101 and a bottom surface 102 connected by four vertical components 103. Two brackets 104 attached to two of the vertical components 103 support the, two piece, horizontal, guide rail and coupling 105 and helix-shaped drive 106. Element 107 comprises the skewer holder, into which skewer 108 is inserted and friction held. Coupling 109 drives the helix-shaped drive. The DC motor (not shown in this view) which drives coupling 109 and the heating coils within the heater and hood assembly are controlled by control box 111.

Figure 2:
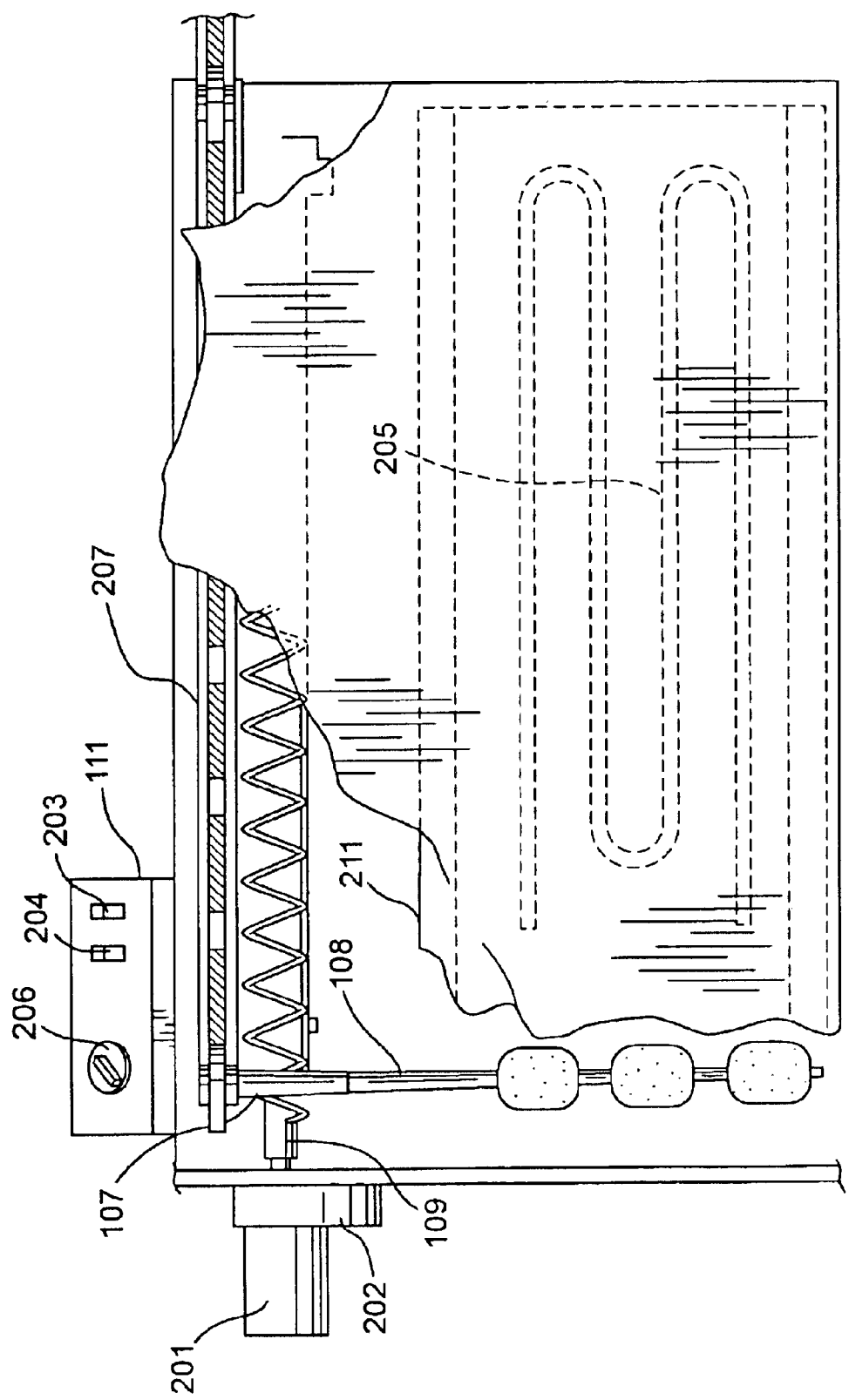
FIG. 2 is a partially cut-away plan view of the FIG. 1 embodiment illustrating the helix-shaped drive, heating element and the skewer holder, skewer and food products.

Referring to FIG. 2, a partial plan view of the invention, motor 201 is connected via its drive gears 202 to the previously mentioned coupling 109.

Control box 111 has mounted thereupon two-position switches 203 and 204 that control power to motor 201 and heater coil 205, respectively. The speed of motor 201 is controlled by rotary dial 206 mounted on control box 111. Element 211 is the heater hood.

Figure 3:
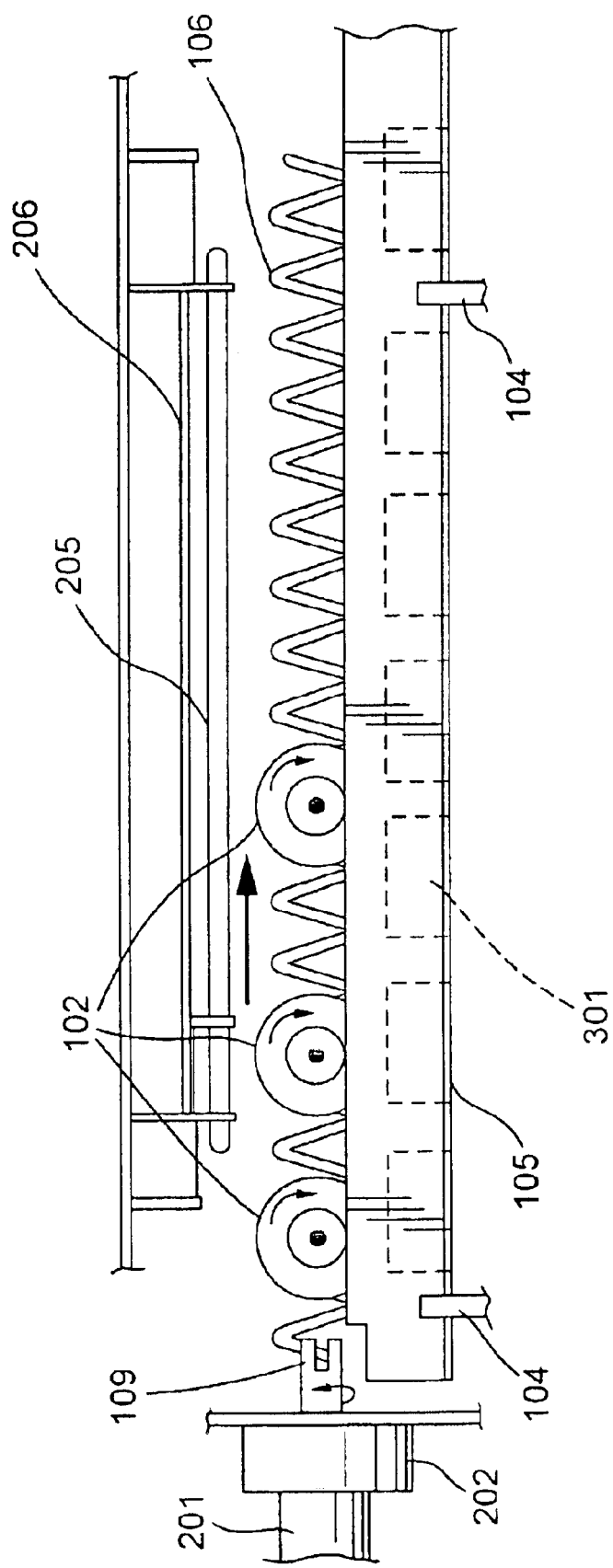
FIG. 3 is a cut-away side view of the FIG. 1 embodiment illustrating the progression of the skewer holders along the rails.

FIG. 3 comprises a detail that illustrates how the helix-shaped drive 106 advances skewer-holders 107 along guide rail section 207. Element 301 is illustrative of the closely spaced magnets in guide rail section 207. The magnets in section 208 are spaced further apart.

Figure 4A:
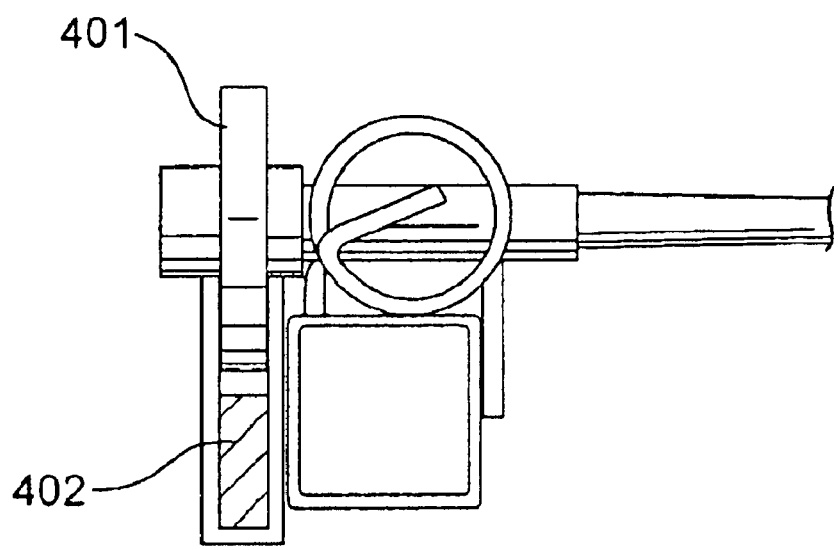
FIG. 4A is an enlarged detail of the helix-shaped drive, skewer holder and rails of the FIG. 1 embodiment.
Figure 4B:
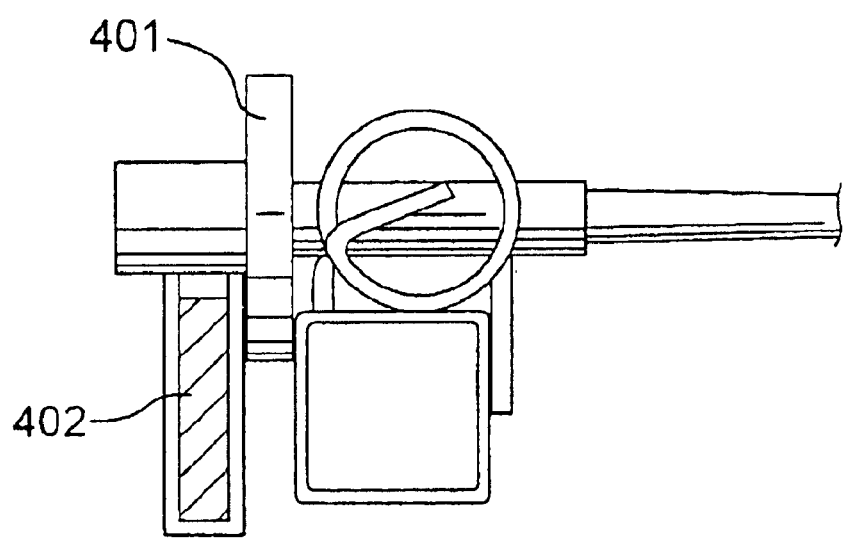
FIG. 4B is an enlarged detail of the helix-shaped drive, skewer holder and rails of the a second embodiment of the invention in which the skewer holder is positioned alongside of the rails.

FIG. 4 illustrates the preferred embodiment 4A and an alternative 4B for the configuration of the skewer holder 401 and the magnets 402 within the guide rail.

Figure 5:
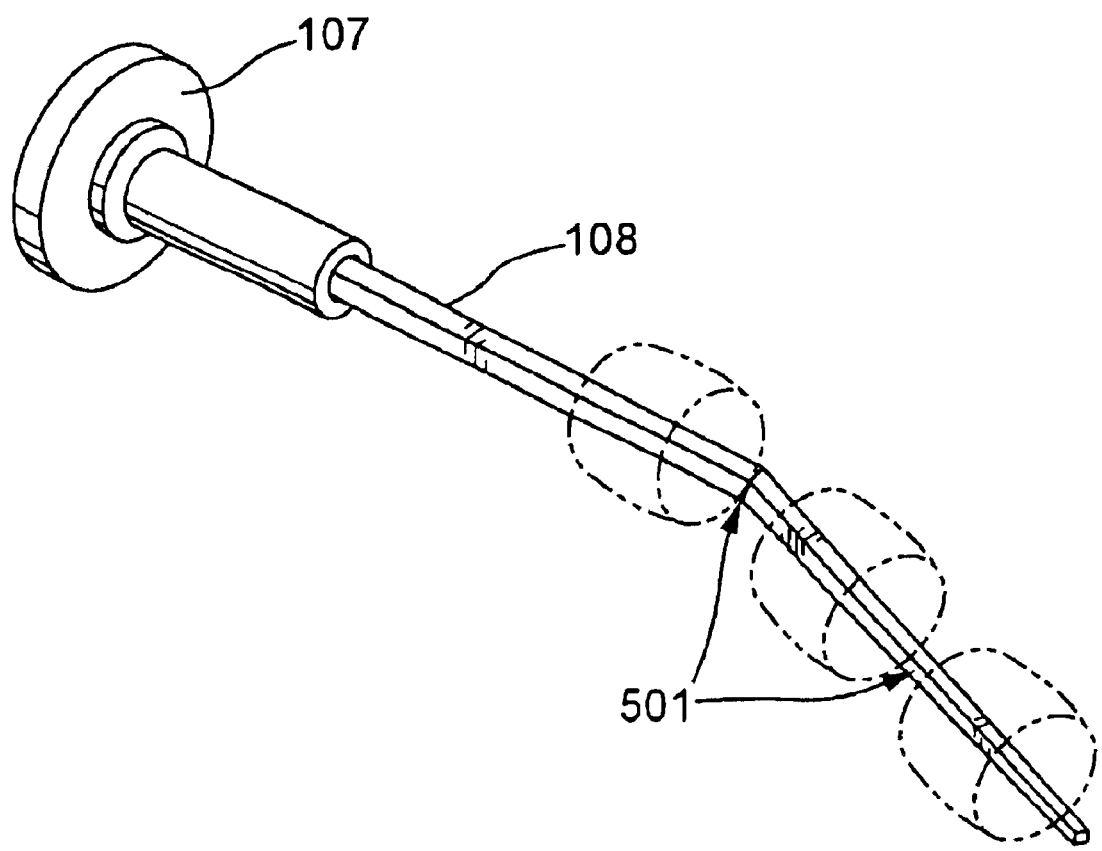
FIG. 5 is a perspective view of the skewer holder, skewer and food products illustrating the breakaway feature of the skewer.

FIG. 5 illustrates the skewer-holder 107 and the breaking of the skewer 108 at the first of two score marks 501.

The progressive roasting and toasting machine has been described with reference to particular embodiments. Other modifications and enhancements can be made without departing from the spirit and scope of the claims that follow.

What is claimed is:

1. A method of food preparation including the steps of:
   placing one or more food items on a carrier;
   removeably positioning said carrier on a transport mechanism;
   utilizing magnetic force to hold said carrier in a stable manner;
   simultaneously rotating and advancing said carrier in a linear direction;
   subjecting said food item to a predetermined level of heat to cook the food items; and,
   removing said carrier from said transport mechanism after said carrier has traveled a pre-determined distance.

2. The method of claim 1 wherein there are two items of food on said carrier during the preparation process.

3. The method of claim 2 wherein said carrier is a one piece member provided with a structurally weakened area.

4. The method of claim 3 wherein said food items are placed on said carrier so that said weakened area is positioned between said food items.

5. The method of claim 1 wherein there are three items of food on said carrier.

6. The method of claim 5 wherein said carrier is a one piece member provided with a weakened area.

7. The method of claim 6 wherein said food items are placed on said carrier so that said weakened area is positioned between two of the three food items.

8. The method of claim 7 wherein there are four or more food items placed on said carrier.

9. The method of claim 1 wherein additional carriers are separately removeably positioned on said transport mechanism at pre-determined time intervals.

10. The method of claim 1 wherein a plurality of said carriers is placed in a pre-loading station.

11. The method of claim 1 wherein said carriers are stored at a pre-determined location.

12. The method of claim 1 wherein one end of said carrier is held on said transport mechanism and the other end is unsupported as it rotates and advances in said linear direction.

13. The method of claim 2 wherein said carrier is a two piece member in which said two pieces are releasably connected to each other.

14. The method of claim 1 wherein said carrier is initially positioned in one of a plurality of locations on said transport mechanism.

15. The method of claim 1 wherein there is a motor speed controller to vary cooking time of said food items.

16. The method of claim 1 wherein said carrier is an elongated structure having two ends, said first end being attached to said transport mechanism and said second end being unsupported in space.

17. The method of claim 1 wherein said transport mechanism includes a rotatable coiled drive means for advancing said carrier.

\* \* \* \* \*